United States Patent
Kimura et al.

(10) Patent No.: US 7,535,199 B2
(45) Date of Patent: May 19, 2009

(54) BATTERY PACK

(75) Inventors: Tadao Kimura, Kobe (JP); Naohisa Morimoto, Osaka (JP); So Kuranaka, Osaka (JP)

(73) Assignee: Panasonic Corporation, Osaka (JP)

( * ) Notice: Subject to any disclaimer, the term of this patent is extended or adjusted under 35 U.S.C. 154(b) by 407 days.

(21) Appl. No.: 11/360,534

(22) Filed: Feb. 24, 2006

(65) Prior Publication Data
US 2006/0192529 A1 Aug. 31, 2006

(30) Foreign Application Priority Data
Feb. 25, 2005 (JP) ............................. 2005-050428

(51) Int. Cl.
*H02J 7/00* (2006.01)
(52) U.S. Cl. ...................... 320/121; 320/120; 320/116; 320/117
(58) Field of Classification Search ................ 320/117, 320/116, 120, 166, 134
See application file for complete search history.

(56) References Cited

U.S. PATENT DOCUMENTS

| | | | | |
|---|---|---|---|---|
| 5,814,970 A | * | 9/1998 | Schmidt | 320/118 |
| 5,898,291 A | * | 4/1999 | Hall | 320/121 |
| 5,960,898 A | * | 10/1999 | Okada et al. | 180/65.8 |
| 6,018,231 A | * | 1/2000 | Shaver et al. | 320/116 |
| 6,140,799 A | * | 10/2000 | Thomasson | 320/117 |

FOREIGN PATENT DOCUMENTS

| | | |
|---|---|---|
| JP | 11-98702 A | 4/1999 |
| JP | 2004-31120 A | 1/2004 |

* cited by examiner

Primary Examiner—Akm E Ullah
Assistant Examiner—Nguyen Tran
(74) Attorney, Agent, or Firm—McDermott Will & Emery LLP

(57) ABSTRACT

A battery pack is provided which includes: a battery set having a plurality of secondary-battery cells connected in series and in parallel; and a battery-abnormality detection circuit. The battery-abnormality detection circuit controls a battery-set circuit separation switch, so as to detect an abnormality in each secondary-battery cell based on a change in the voltage of each cell when parallel-connection separation switches are turned off, and if detecting an abnormal secondary-battery cell, so as to separate the series module including this cell from a battery-set body.

11 Claims, 6 Drawing Sheets

BATTERY PACK

BACKGROUND OF THE INVENTION

1. Field of the Invention

The present invention relates to a battery pack which is formed by using secondary-battery cells that are repeatedly charged and discharged. Particularly, it relates to a battery pack which includes a battery-abnormality detection circuit for detecting a secondary-battery cell being abnormal.

2. Description of the Background Art

A battery pack is used as the power source of electronic equipment, such as a cellular phone and a notebook personal computer. A nickel-cadmium battery, a nickel-metal hydride battery or a lithium-ion secondary battery is used for a battery pack. In recent years, a lithium-ion secondary battery is most popular because of its light weight and large capacity.

Herein, if the voltage or the capacity of a single lithium-ion secondary battery is enough for the power required for a mobile phone or the like, a battery pack is formed by one lithium-ion secondary battery. On the other hand, a notebook personal computer or the like needs a high voltage or a great power, and thus, several secondary-battery cells are used for such equipment. They are connected in series to form a module, and then, such modules are connected in parallel. Or, in contrast, they are connected in parallel to form a module, and then, such modules are connected in series. This makes up a battery set which forms a battery pack.

In the case of such a battery set, let's assume, for example, that a minute internal short circuit is generated in one secondary-battery cell. At that time, if this secondary-battery cell subjected to the minute internal short circuit is connected in parallel with a secondary-battery cell, the latter cell's capacity is also discharged through the short circuit of the secondary-battery cell subjected to the minute internal short circuit. Thereby, the capacity of this parallel battery (i.e., the latter secondary-battery cell connected in parallel) is reduced, resulting in a drop in the battery set's capacity. If such a drop in the capacity is sharp, this parallel battery's residual capacity is zero and the other batteries (or the other secondary-battery cells) are fully charged. This disables the battery set from being charged and discharged.

In this way, in a battery pack formed by a battery set in which several secondary-battery cells are used, if a battery becomes abnormal, various methods for detecting it have conventionally been adopted.

For example, Japanese Patent Laid-Open No. 2004-31120 specification reference proposes an abnormality diagnosis apparatus. In this apparatus, a plurality of secondary-battery cells are connected in parallel. Then, several such parallel modules are connected in series to form a battery set. In this battery set, an abnormality in the cells connected in parallel is certainly diagnosed.

In addition, Japanese Patent Laid-Open No. 11-98702 specification also suggests an abnormality detection apparatus. In this apparatus, parallel modules are connected in series to form a battery set. When an abnormality is detected in charging this battery set, both an overcharge abnormality in a battery pack's parallel modules and an abnormality in a battery charger can be detected.

However, in the abnormality detection apparatus according to the prior art, an abnormality in the battery pack can be detected, but if a failure is produced in only one secondary-battery cell, the entire battery pack becomes unusable.

SUMMARY OF THE INVENTION

It is an object of the present invention to provide a battery pack which can be kept in use, by specifying an abnormal secondary-battery cell and separating a series module including this secondary-battery cell, with this single series module's capacity only reduced.

A battery pack according to an aspect of the present invention, comprising: a battery set which includes a plurality of series modules connected in parallel having a plurality of secondary-battery cells connected in series, each of the secondary-battery cells forming each series module being connected in parallel; and a battery-abnormality detection circuit which detects an abnormal state in the battery set, wherein: the battery set further includes a plurality of parallel-connection separation switches which electrically separate the secondary-battery cells connected in parallel, and a plurality of battery-set circuit separation switches which separate the series modules separated by the parallel-connection separation switches from a battery-set body connected to an external circuit; the battery-abnormality detection circuit further includes a detection-circuit changing switch which changes the connection state to the battery set, so as to detect the voltage of the secondary-battery cells connected in parallel when the parallel-connection separation switch is turned on and so as to detect the voltage of each secondary-battery cell whose parallel connection is separated when the parallel-connection separation switch is turned off; and the battery-abnormality detection circuit controls the battery-set circuit separation switch, so as to detect an abnormal state in each secondary-battery cell, based on a change in the voltage of each secondary-battery cell whose parallel connection is separated when the parallel-connection separation switch is turned off and so as to separate, from the battery-set body, the series module including the secondary-battery cell whose abnormal state is detected.

A battery pack according to another aspect of the present invention, comprising: a battery set which includes a plurality of series modules connected in parallel having a plurality of secondary-battery cells connected in series, each of the secondary-battery cells forming each series module being connected in parallel; and a battery-abnormality detection circuit which individually detects the voltage of each secondary-battery cell forming each series module, and based on a change in the voltage of each secondary-battery cell, individually detects an abnormal state in each secondary-battery cell, wherein: the battery set further includes a plurality of battery-set circuit separation switches which separate each series module from an external load; and the battery-abnormality detection circuit controls the connection state of the plurality of battery-set circuit separation switches, so as to electrically separate, from the external load, the series module including the secondary-battery cell whose abnormal state is detected.

Each battery pack described above can be kept in use, by specifying an abnormal secondary-battery cell and separating a series module including this secondary-battery cell, with this single series module's capacity only reduced.

These and other objects, features and advantages of the present invention will become more apparent upon reading of the following detailed description along with the accompanied drawings.

DESCRIPTION OF THE PREFERRED EMBODIMENTS

Hereinafter, embodiments of the present invention will be described with reference to the attached drawings.

First Embodiment

Figure 1:
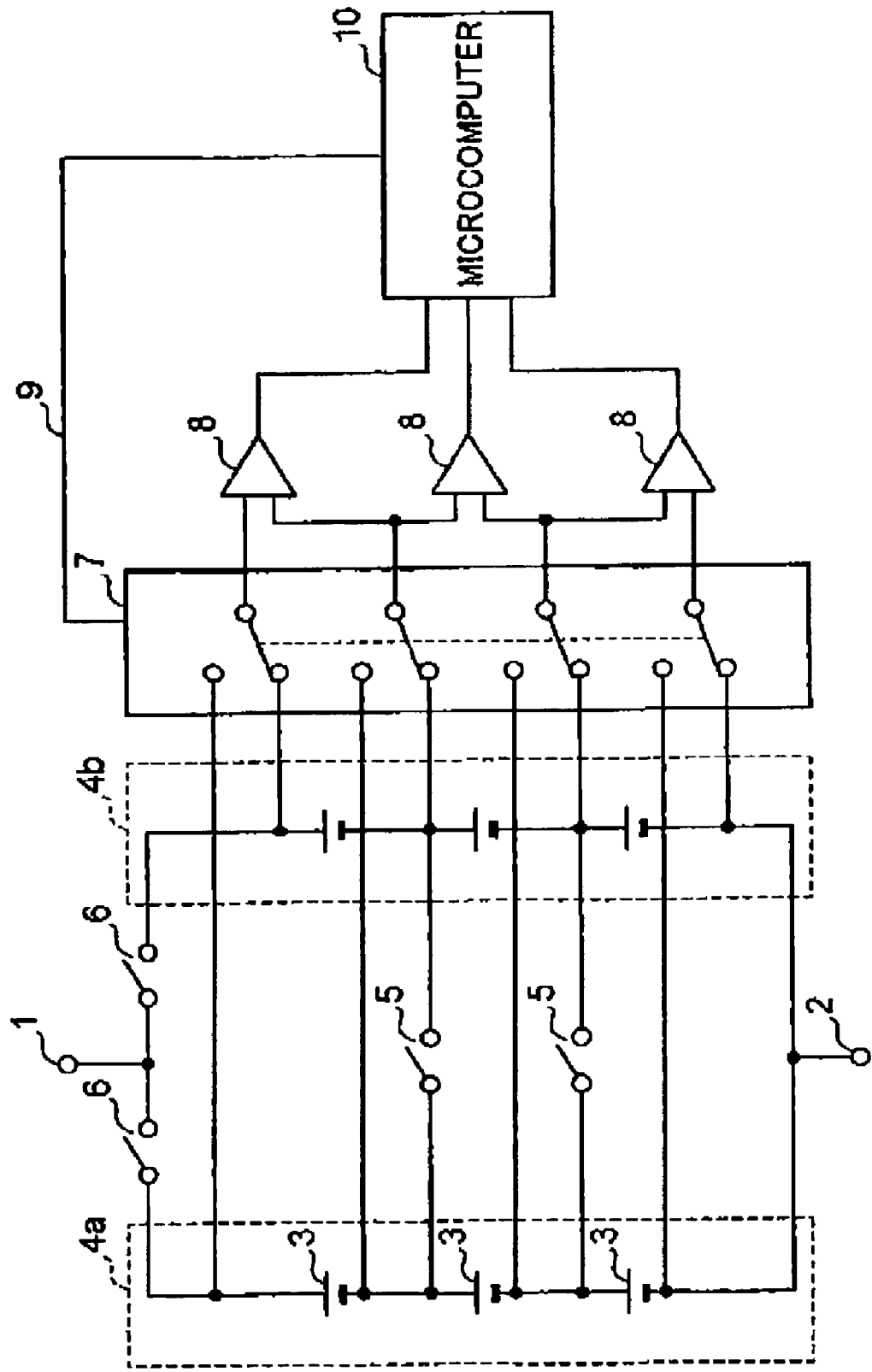
FIG. 1 is a circuit diagram, typifying the circuit configuration of a battery pack according to a first embodiment of the present invention.

FIG. 1 is a circuit diagram, typifying the circuit configuration of a battery pack according to a first embodiment of the present invention. In this case, the number of series modules in parallel is two.

In FIG. 1, reference numeral 1 denotes a plus terminal and reference numeral 2 designates a minus terminal. The plus terminal 1 and the minus terminal 2 are connected to an external circuit (not shown) as the external load. Three secondary-battery cells 3 are connected in series to form each series module 4a, 4b. The two series modules 4a, 4b are connected in parallel between the plus terminal 1 and the minus terminal 2. Thereby, a battery set is formed.

In addition, the secondary-battery cells 3 which make up the series modules 4a, 4b are each connected in parallel via a parallel-connection separation switch 5. Besides, a battery-set circuit separation switch 6 is connected to each series module 4a, 4b. Thereby, each series module 4a, 4b can be separated from a battery-set body or the plus terminal 1.

At the time of an ordinary operation, the battery pack is used with the parallel-connection separation switch 5 turned on. At this time, the two secondary-battery cells 3 connected in parallel have the same voltage. Hence, regardless to the position of a voltage-detection changing switch 7, a microcomputer 10 having an AD-conversion function can detect, via amplifiers 8, the voltage of the two secondary-battery cells 3 connected in parallel. This microcomputer 10 is not necessarily required to have an AD-conversion function. A voltage detector and a microcomputer may also be combined.

Furthermore, the microcomputer 10 outputs a switch signal through a signal line (not shown) to the parallel-connection separation switches 5 and the battery-set circuit separation switches 6. Thereby, the connection state is changed of the parallel-connection separation switches 5 and the battery-set circuit separation switches 6. Incidentally, the control of the connection state of the parallel-connection separation switches 5 and the battery-set circuit separation switches 6 is not limited especially to the above described example. The connection state may also be changed, using another control circuit except the microcomputer 10.

Periodically, the microcomputer 10 turns off the parallel-connection separation switches 5 and keeps this state for a specific period of time, for example, several hours to some days. During this operation, the microcomputer 10 outputs a voltage-detection switch signal through a voltage-detection switch-signal line 9 to the voltage-detection changing switch 7. Thereby, the voltage-detection changing switch 7 is changed so that the voltage of the secondary-battery cells 3 is individually measured by the microcomputer 10.

For example, at regular intervals, the microcomputer 10 turns off the parallel-connection separation switches 5 over a certain period. At this time, the microcomputer 10 outputs the voltage-detection switch signal via the voltage-detection switch-signal line 9 to the voltage-detection changing switch 7. Thereby, the voltage-detection changing switch 7 is changed. Each amplifier 8 amplifies the voltage of the secondary-battery cell 3 connected via the voltage-detection changing switch 7. Then, each amplifier 8 outputs the voltage of the secondary-battery cell 3 for each series module 4a, 4b to the microcomputer 10. The microcomputer 10 separately measures the voltage outputted by each amplifier 8.

At this time, the series modules 4a, 4b remain connected in parallel, so that electronic equipment as the load can be continuously used. For example, if a secondary-battery cell (i.e., an abnormal secondary-battery cell) subjected to an abnormality such as a minute internal short circuit is included in the series modules 4a, 4b, then the individual secondary-battery cells 3 lose their balance, though the total sum of the voltage of the series modules 4a, 4b remains unchanged. This makes the abnormal secondary-battery cell's voltage an abnormal value.

The microcomputer 10 detects the abnormal secondary-battery cell, based on the output voltage of each amplifier 8. Then, it turns off the battery-set circuit separation switch 6 of the series module in which the abnormal secondary-battery cell has been detected. Thereby, it is cut off from the battery-set body or the plus terminal 1. At this time, the microcomputer 10 is keeping the parallel-connection separation switches 5 turned off. This prevents the abnormal secondary-battery cell from connecting through the parallel connection path with the battery-set body and the external circuit.

As described above, in this embodiment, the capacity of one series module (i.e., a series module in which an abnormal secondary-battery cell is detected) decreases. However, the other series module (i.e., a series module in which no abnormal secondary-battery cell is detected) can be certainly used.

Incidentally, as the voltage detection circuit for detecting the voltage of a secondary-battery cell, in order to the voltage of each secondary-battery cell, as many voltage detection circuits as those cells not necessarily have to be provided. Using an amplifier, an AD converter or the like in common, a voltage detection circuit may also be used in the method of switching it for each secondary-battery cell. In this case, the costs can be prevented from being greater, and the circuits become smaller. Besides, the voltage of each parallel cell is measured by the same voltage detector, or amplifier and AD converter. This also helps largely reduce the wrong detection of an abnormality which may be caused by an error in measurement. In addition, the number of series modules in parallel is not limited to two. The same advantage can be obtained, even if more series modules are used.

Second Embodiment

Figure 2:
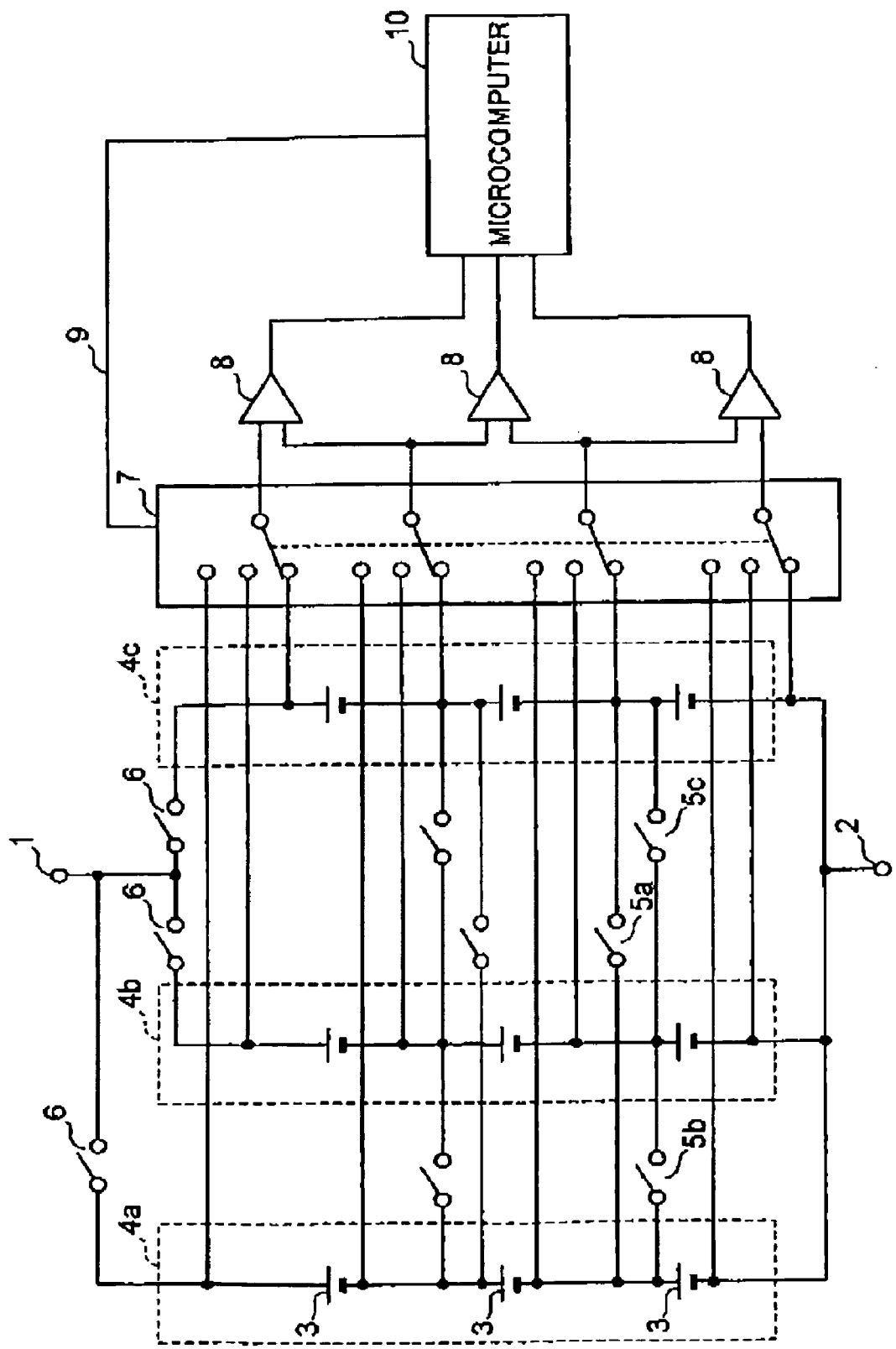
FIG. 2 is a circuit diagram, typifying the circuit configuration of a battery pack according to a second embodiment of the present invention.

FIG. 2 is a circuit diagram, typifying the circuit configuration of a battery pack according to a second embodiment of the present invention. In this case, the number of series modules in parallel is three.

Figure 3:
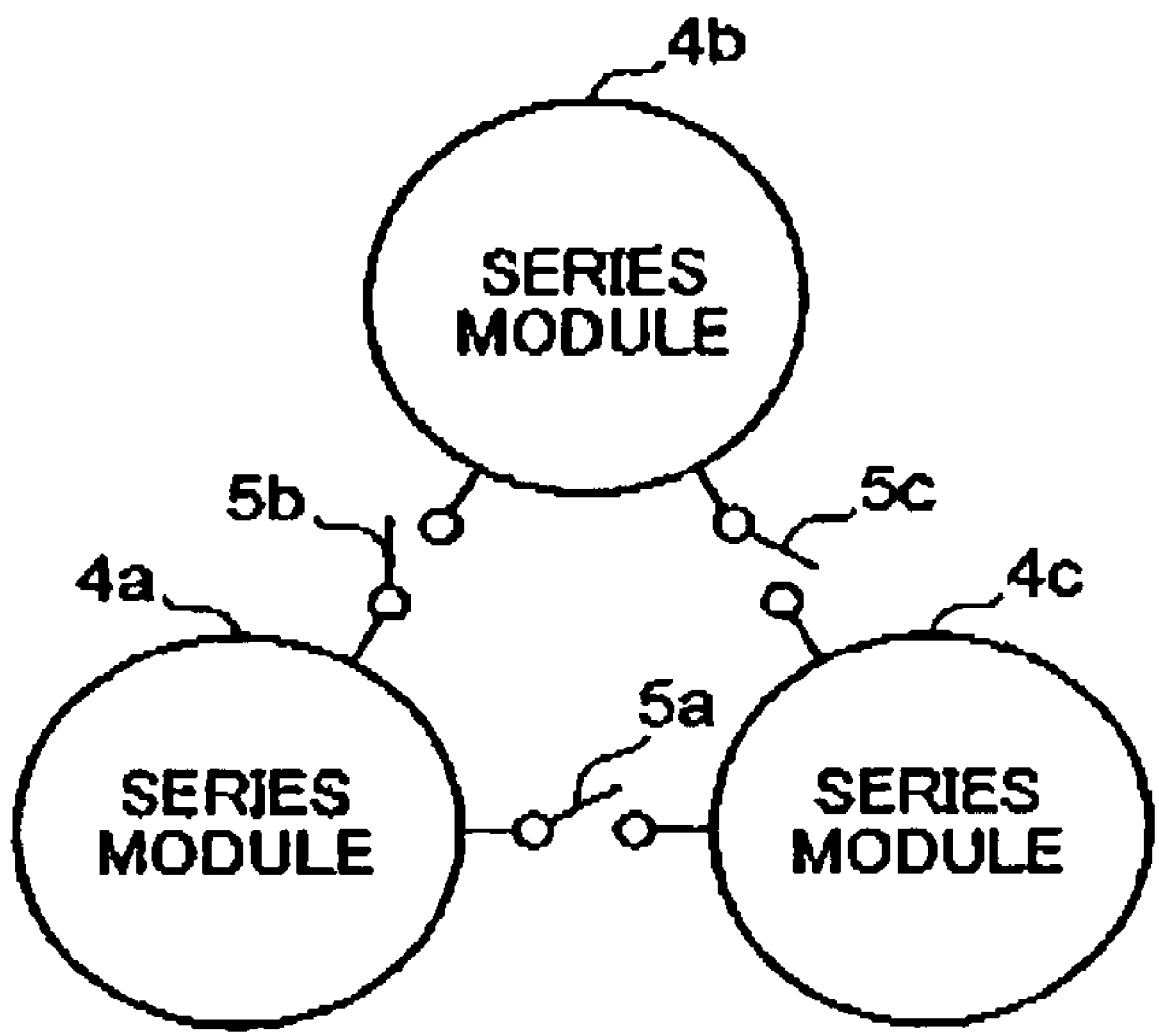
FIG. 3 is an illustration, typifying the connection relation between series modules and parallel-connection separation switches of the battery pack shown in FIG. 2.

Herein, component elements are given the same reference characters and numerals as those of FIG. 1, as long as they each have an equivalent function to those according to the first embodiment described earlier. Thus, their description is omitted. The method of monitoring the voltage at the time of an ordinary operation and measuring the voltage of the individual secondary-battery cells 3 at regular intervals is identical to that of the first embodiment This embodiment is different from the first embodiment, in the connection relation between three series modules 4a, 4b, 4c and three parallel-connection separation switches 5a, 5b, 5c. FIG. 3 is an illustration, typifying the connection relation between the series modules and the parallel-connection separation switches of the battery pack according to the second embodiment.

In FIG. 3, the series modules 4a, 4b and 4c are connected in parallel, in the shape of a triangle or a network, via the parallel-connection separation switches 5a, 5b and 5c. Herein, for example, if an abnormal secondary-battery cell is detected in the series module 4a, the microcomputer 10 turns off the two sets of parallel-connection separation switches 5a and 5b. As a result, in this embodiment as well, the abnormal secondary-battery cell is not connected through the parallel connection path with the battery-set body. This makes it possible to separate the abnormal secondary-battery cell electrically from the external circuit.

In this way, in this embodiment as well, the capacity of one series module (i.e., a series module in which an abnormal secondary-battery cell is detected) is reduced. However, the remaining two series modules (i.e., series modules in which an abnormal secondary-battery cell is not detected) can be certainly used.

Third Embodiment

As described so far, in the first embodiment or the second embodiment, individual secondary-battery cells are directly connected via parallel-connection separation switches. In this connection method, their circuit can be easily formed in the case of two or three series modules. However, if more series modules are provided, they are difficult to connect in a network form. Hence, according to a third embodiment of the present invention, this problem can be resolved in the following way.

Figure 4:
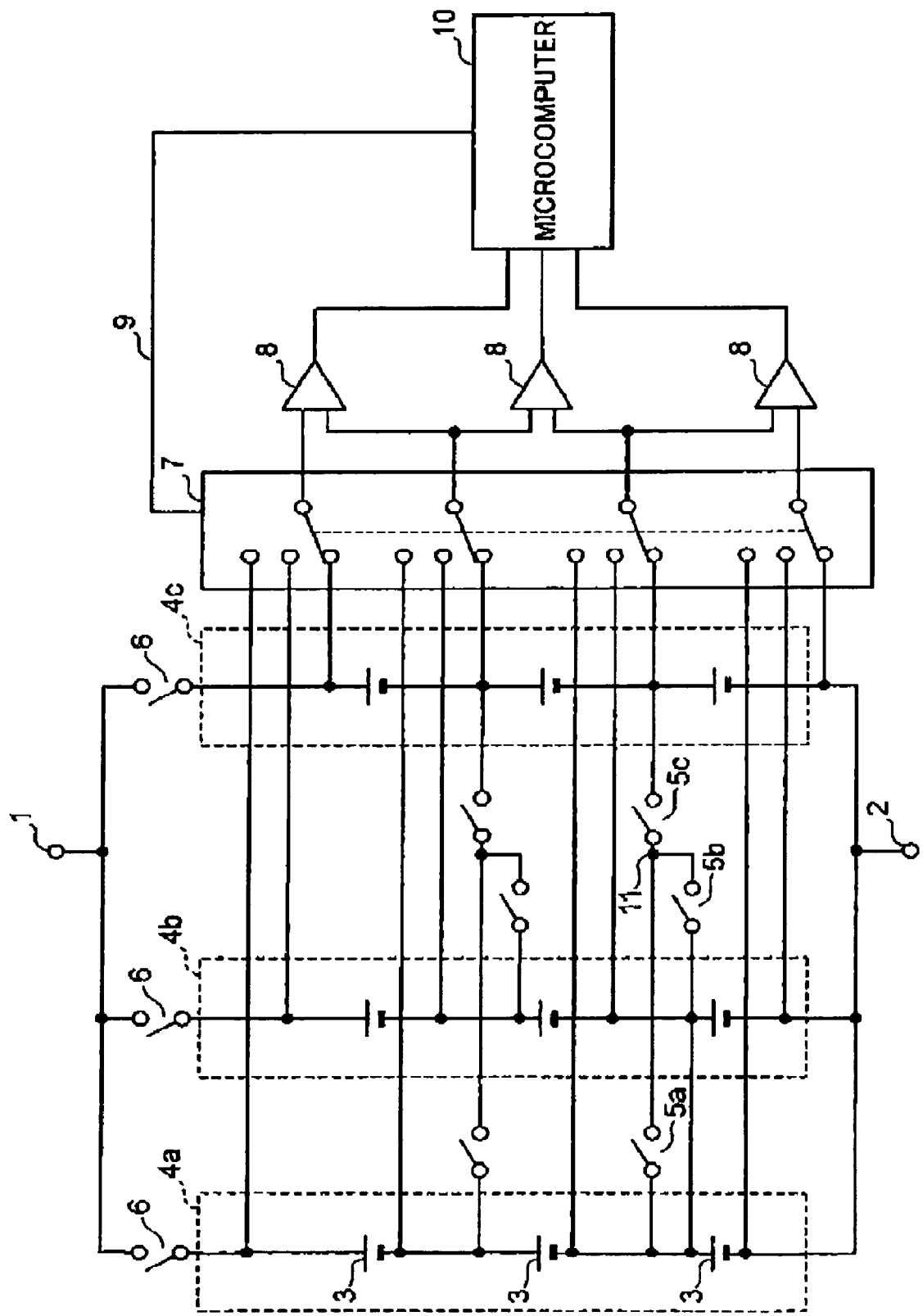
FIG. 4 is a circuit diagram, typifying the circuit configuration of a battery pack according to a third embodiment of the present invention.

FIG. 4 is a circuit diagram, typifying the circuit configuration of a battery pack according to the third embodiment. In this case as well, the number of series modules in parallel is three.

Herein, component elements are given the same reference characters and numerals as those of FIG. 1, as long as they each have an equivalent function to those according to the first embodiment described earlier. Thus, their description is omitted. The method of monitoring the voltage at the time of an ordinary operation and measuring the voltage of the individual secondary-battery cells 3 at regular intervals is identical to that of the first embodiment This embodiment is different from the first embodiment and the second embodiment, in the connection relation between three series modules 4a, 4b, 4c and three parallel-connection separation switches 5a, 5b, 5c. In this embodiment, to secondary-battery cells 3 except the secondary-battery cell 3 at a tail end of each series module 4, in other words, between each secondary-battery cell 3 connected in series, one end of each parallel-connection separation switch 5a, 5b and 5c is connected, respectively. The other end of each parallel-connection separation switch 5a, 5b and 5c is electrically connected at one point 11.

Figure 5:
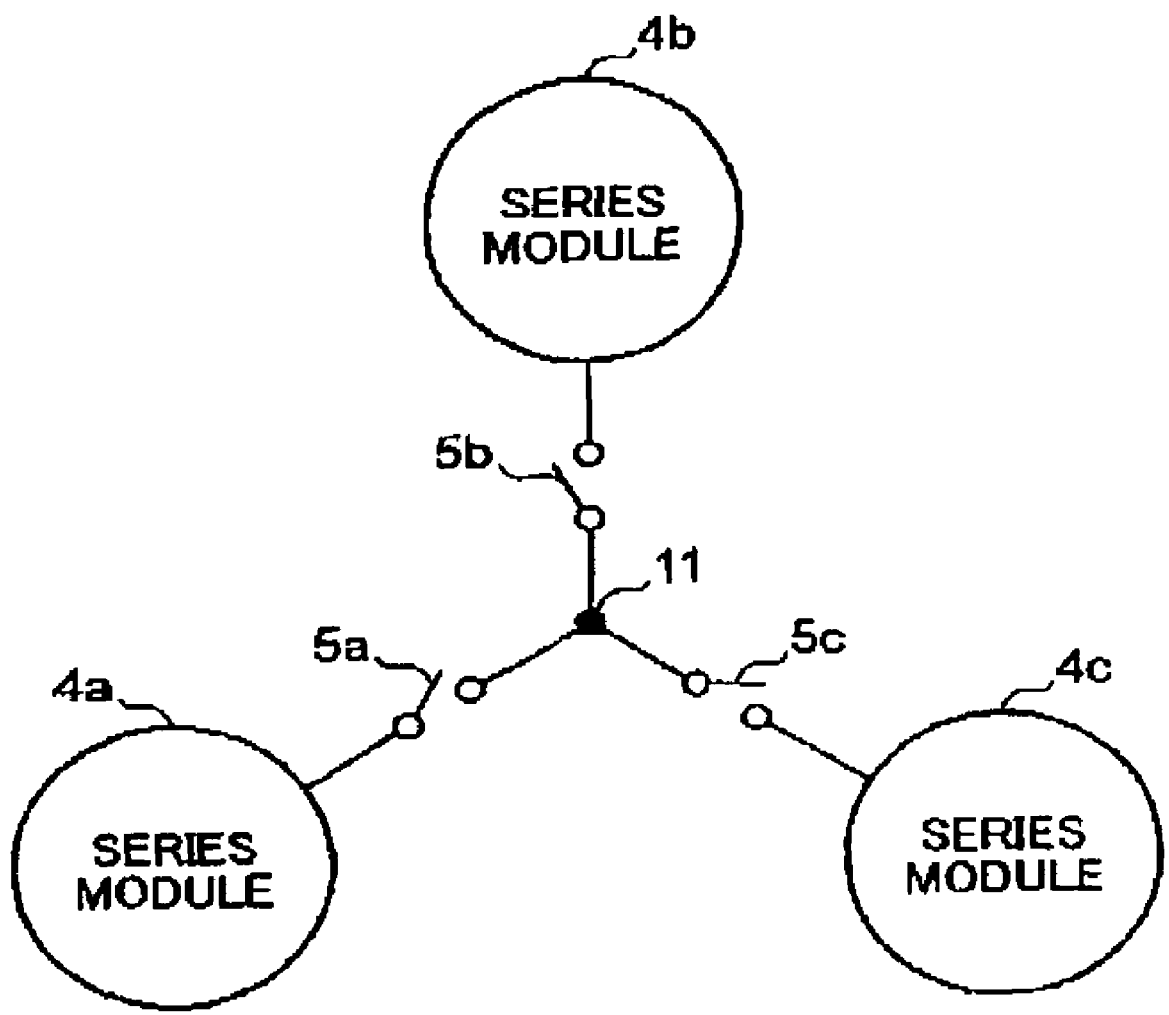
FIG. 5 is an illustration, typifying the connection relation between series modules and parallel-connection separation switches of the battery pack shown in FIG. 4.

FIG. 5 is an illustration, typifying the connection relation between the series modules and the parallel-connection separation switches of the battery pack according to the third embodiment. In FIG. 5, one end of each parallel-connection separation switch 5a, 5b and 5c is connected to each series module 4a, 4b and 4c. The other end of each parallel-connection separation switch 5 is electrically connected at the single point 11. Thereby, the secondary-battery cells which make up each series module 4a, 4b and 4c are each connected in parallel. Herein, for example, if an abnormal secondary-battery cell is detected in the series module 4a, the one set of parallel-connection separation switches 5a is turned off. Only by doing this, the series module 4a can be cut off.

In this way, in this embodiment as well, the capacity of one series module (i.e., a series module in which an abnormal secondary-battery cell is detected) is reduced. However, the remaining two series modules (i.e., series modules in which an abnormal secondary-battery cell is not detected) can be certainly used.

Figure 6:
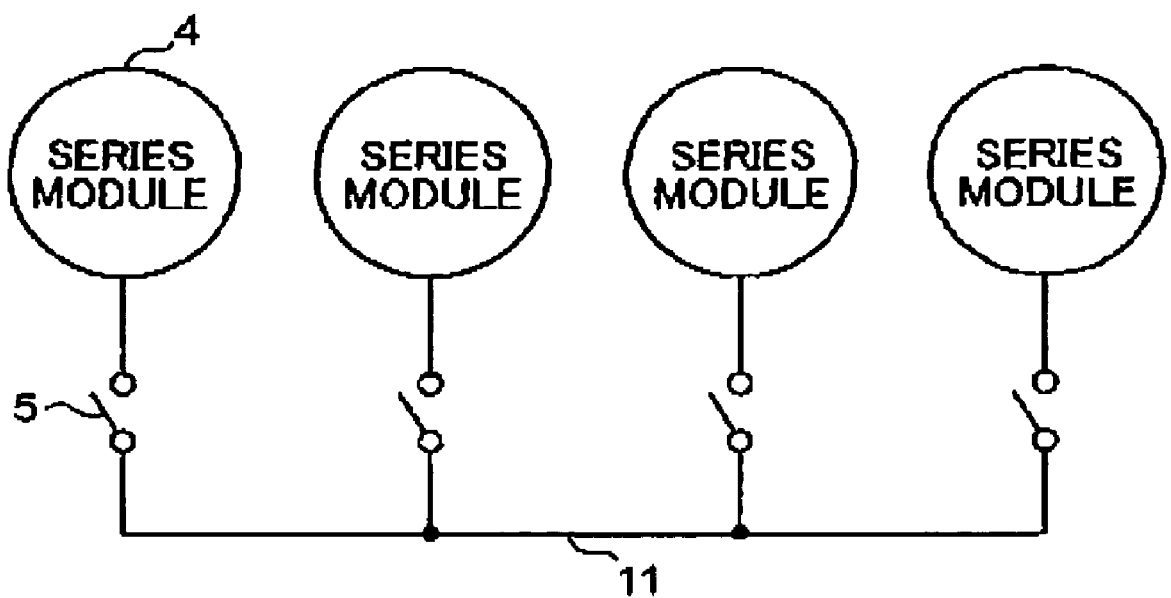
FIG. 6 is an illustration, typifying the connection relation between series modules and parallel-connection separation switches according to another embodiment.

In addition, in this embodiment, parallel-connection separation switches are used, one end of which is connected in common. In this case, if the number of series modules is increased, for example, even if four series modules are connected in parallel, then as shown in FIG. 6, a set of parallel-connection separation switches may be simply added. Incidentally, as can be seen from FIG. 6, there is no need for the single electrical point 11 to be a physical point. Hence, it is enough just to keep it electrically connected.

As described so far, in the battery pack according to each embodiment, a secondary-battery cell in which an abnormality is generated is specified. Then, the series module including the specified secondary-battery cell is disconnected. This allows it to be kept in use with this single series module's capacity only reduced. Therefore, it is useful as the power source of electronic equipment such as a notebook personal computer.

As described above, a battery pack according to the present invention, comprising: a battery set which includes a plurality of series modules connected in parallel having a plurality of secondary-battery cells connected in series, each of the secondary-battery cells forming each series module being connected in parallel; and a battery-abnormality detection circuit which detects an abnormal state in the battery set, wherein: the battery set further includes a plurality of parallel-connection separation switches which electrically separate the secondary-battery cells connected in parallel, and a plurality of battery-set circuit separation switches which separate the series modules having the secondary-battery cells separated by the parallel-connection separation switches from a battery-set body connected to an external circuit; the battery-abnormality detection circuit further includes a detection-circuit changing switch which changes the connection state to the battery set, so as to detect the voltage of the secondary-battery cells connected in parallel when the parallel-connection separation switch is turned on and so as to detect the voltage of each secondary-battery cell whose parallel connection is separated when the parallel-connection separation switch is turned off; and the battery-abnormality detection circuit controls the battery-set circuit separation switch, so as to detect an abnormal state in each secondary-battery cell, based on a change in the voltage of each secondary-battery cell whose parallel connection is separated when the parallel-connection separation switch is turned off and so as to separate, from the battery-set body, the series module including the secondary-battery cell whose abnormal state is detected.

In the battery pack according to the present invention, the electrical connection in the battery set is configured so that the secondary-battery cells connected in parallel can be cut off by switches. Besides, switches are provided which separate a specific series module with all the parallel connections disconnected.

At the time of an ordinary operation, it is used with the switches closed between the secondary-battery cells connected in parallel. Then, it is used, periodically, with the parallel connections disconnected for a specific period of time (from several hours to a few days). During this operation, the connection state is changed of a voltage-detection changing switch provided in the battery-abnormality detection circuit. Thereby, the voltage of each secondary-battery cell is individually measured.

If a secondary-battery cell subjected to a minute internal short circuit is included in the battery set, a difference is made in the voltage supposed to be equal between the two cells connected in parallel at the time of the parallel connection. This is because only the voltage of the secondary-battery cell (i.e., the minute short-circuit cell) subjected to a minute internal short circuit goes down. In this method, the minute short-circuit cell can be detected.

As described earlier, if the minute short-circuit cell is connected in parallel, the capacity of the secondary-battery cell connected in parallel is also discharged through the short circuit of the minute short-circuit cell. Thereby, the capacity of this secondary-battery cell connected in parallel is reduced, resulting in a drop in the battery set's capacity. If such a drop in the capacity is sharp, the residual capacity of this secondary-battery cell connected in parallel is zero and the other secondary-battery cells are fully charged. This disables the battery set from being charged and discharged. Hence, if a minute short circuit is detected, then without connecting the series module including this secondary-battery cell in parallel, the battery-set circuit is formed only by the normal series modules. Thereby, its capacity is reduced by the single series module's capacity, but the remaining capacity can be certainly used. This makes it possible to continue using it with this single series module's capacity only lowered.

By the way, a secondary-battery cell can fall abnormal in the case of not only the above described minute internal short circuit, but also an extreme battery-capacity degradation, a safety device's operation, a lead wire's disconnection, or the like. These can also be detected based on similar abnormalities in the voltage's behavior. Hence, without connecting the series module including this abnormal secondary-battery cell, the battery-set circuit is formed only by the normal series modules.

It is preferable that the plurality of series modules include two or three series modules; and one end of the parallel-connection separation switch be connected between secondary-battery cells of one series module, and the other end of the parallel-connection separation switch be connected between secondary-battery cells of another series module.

In this case, if the number of series modules is two or three, the circuit can be formed by fewer parallel-connection separation switches.

Preferably, the plurality of series modules should include three or more series modules; and one end of the parallel-connection separation switch should be connected between secondary-battery cells of each series module, and the other end of the parallel-connection separation switch should be electrically connected to one connection point.

In this case, even if more series modules are provided, the battery set can be formed simply by adding one set of parallel-connection separation switches per series module.

Furthermore, another battery pack according to the present invention, comprising: a battery set which includes a plurality of series modules connected in parallel having a plurality of secondary-battery cells connected in series, each of the secondary-battery cells forming each series module being connected in parallel; and a battery-abnormality detection circuit which individually detects the voltage of each secondary-battery cell forming each series module, and based on a change in the voltage of each secondary-battery cell, individually detects an abnormal state in each secondary-battery cell, wherein: the battery set further includes a plurality of battery-set circuit separation switches which separate each series module from an external load; and the battery-abnormality detection circuit controls the connection state of the plurality of battery-set circuit separation switches, so as to electrically separate, from the external load, the series module including the secondary-battery cell whose abnormal state is detected.

In this battery pack, the voltage of each secondary-battery cell forming each series module is individually detected. Then, based on a change in the detected voltage of each secondary-battery cell, an abnormal state in each secondary-battery cell is individually detected. Sequentially, the series module including the secondary-battery cell whose abnormal state has been detected is electrically separated from the external load. Therefore, it can be kept in use with the capacity of this single series module including the secondary-battery cell whose abnormal state has been detected only reduced.

It is preferable that the battery set further include a plurality of parallel-connection separation switches which individually separate the secondary-battery cells connected in parallel; and the battery-abnormality detection circuit control the connection state of the plurality of battery-set circuit separation switches, so as to detect the voltage of each secondary-battery cell whose parallel connection is separated when the parallel-connection separation switch is turned off and so as to electrically separate, from the external load, the series module including the secondary-battery cell whose abnormal state is detected.

In this case, if the parallel-connection separation switch is turned off, the secondary-battery cells connected in parallel can be individually separated. Therefore, only the secondary-battery cell whose abnormal state has been detected can be cut off from the parallel connection. This makes it possible to certainly separate the series module including the corresponding secondary-battery cell electrically from the external load.

Preferably, the battery-abnormality detection circuit should monitor the voltage of the secondary-battery cells connected in parallel when the parallel-connection separation switch is turned on.

In this case, in ordinary use, the secondary-battery cells are used with connected in parallel. At the same time, the voltage of the secondary-battery cells connected in parallel is monitored. This helps surely detect an abnormality in them.

It is preferable that the parallel-connection separation switch include a switch one end of which is connected between secondary-battery cells of one series module and the other end is connected between secondary-battery cells of another series module, so that each secondary-battery cell of each series module is connected in parallel. In this case, the number of such parallel-connection separation switches can be reduced, thus simplifying the circuit configuration.

Preferably, the plurality of series modules should include two or three series modules. In this case, the circuit can be configured by fewer parallel-connection separation switches.

In order to connect each secondary-battery cell of each series module in parallel, the parallel-connection separation switch may also be configured so as to include a switch whose one end is connected between secondary-battery cells of each series module and its other end is electrically connected to one connection point.

In this case, even if more series modules are provided, the battery set can be formed merely by adding one set of parallel-connection separation switches per series module. This helps make the circuit configuration simpler.

It is preferable that the plurality of series modules include three or more series modules. In this case, if more series modules connected in parallel are provided, that can increase the battery pack's capacity.

Preferably, the battery-abnormality detection circuit should further include a detection-circuit changing switch which selectively outputs the voltage of each secondary-battery cell of one series module among the plurality of series modules; and the battery-abnormality detection circuit should change the parallel-connection separation switch to its turned-off state, should change the connection state of the detection-circuit changing switch, thereby should individually detect the voltage of each secondary-battery cell forming each series module, and based on a change in the voltage of each secondary-battery cell, should individually detect an abnormal state in each secondary-battery cell.

In this case, the voltage of each secondary-battery cell of one series module among the plurality of series modules is selectively outputted. Based on a change in the outputted voltage of each secondary-battery cell, an abnormal state in each secondary-battery cell is individually detected. Hence, there is no need to provide the battery-abnormality detection circuit for each series module. This helps make the circuit configuration simpler.

It is preferable that the detection-circuit changing switch selectively output each terminal voltage of the plurality of secondary-battery cells forming one series module among the plurality of series modules; the battery-abnormality detection circuit further include a plurality of amplifiers which output the voltage of each secondary-battery cell based on each terminal voltage; and the battery-abnormality detection circuit individually detect each output of the plurality of amplifiers, and based on a change in the voltage which it detects, individually detect an abnormal state in each secondary-battery cell.

In this case, each terminal voltage of the plurality of secondary-battery cells forming one series module is selectively outputted. Then, the voltage of each secondary-battery cell based on each outputted terminal voltage is outputted. Sequentially, these outputs are individually detected, and based on a change in the detected voltage, an abnormal state in each secondary-battery cell is individually detected. Therefore, using as many amplifiers as the secondary-battery cells forming one series module, the voltage of each secondary-battery cell can be detected.

This application is based on Japanese patent application serial No. 2005-050428, filed in Japan Patent Office on Feb. 25, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A battery pack, comprising:
    a battery set which includes a plurality of series modules connected in parallel having a plurality of secondary-battery cells connected in series, each of the secondary-battery cells forming each series module being connected in parallel; and
    a battery-abnormality detection circuit which detects an abnormal state in the battery set, wherein:
    the battery set further includes,
    a plurality of parallel-connection separation switches which electrically separate the secondary-battery cells connected in parallel, and
    a plurality of battery-set circuit separation switches which separate the series modules having the secondary-battery cells separated by the parallel-connection separation switches from a battery-set body connected to an external circuit;
    the battery-abnormality detection circuit further includes a detection-circuit changing switch which changes the connection state to the battery set, so as to detect the voltage of the secondary-battery cells connected in parallel when the parallel-connection separation switch is turned on and so as to detect the voltage of each secondary-battery cell whose parallel connection is separated when the parallel-connection separation switch is turned off; and
    the battery-abnormality detection circuit controls the battery-set circuit separation switch, so as to detect an abnormal state in each secondary-battery cell, based on a change in the voltage of each secondary-battery cell whose parallel connection is separated when the parallel-connection separation switch is turned off and so as to separate, from the battery-set body, the series module including the secondary-battery cell whose abnormal state is detected.

2. The battery pack according to claim 1, wherein: the plurality of series modules includes two or three series modules; and one end of the parallel-connection separation switch is connected between secondary-battery cells of one series module, and the other end of the parallel-connection separation switch is connected between secondary-battery cells of another series module.

3. The battery pack according to claim 1, wherein: the plurality of series modules includes three or more series modules; and one end of the parallel-connection separation switch is connected between secondary-battery cells of each series module, and the other end of the parallel-connection separation switch is electrically connected to one connection point.

4. A battery pack, comprising:
    a battery set which includes a plurality of series modules connected in parallel having a plurality of secondary-battery cells connected in series, each of the secondary-battery cells forming each series module being connected in parallel; and
    a battery-abnormality detection circuit which individually detects the voltage of each secondary-battery cell forming each series module, and based on a change in the voltage of each secondary-battery cell, individually detects an abnormal state in each secondary-battery cell, wherein:

the battery set further includes a plurality of battery-set circuit separation switches which separate each series module from an external load; and the battery-abnormality detection circuit controls the connection state of the plurality of battery-set circuit separation switches, so as to electrically separate, from the external load, the series module including the secondary-battery cell whose abnormal state is detected, wherein: the battery set further includes a plurality of parallel-connection separation switches which individually separate the secondary-battery cells connected in parallel; and the battery-abnormality detection circuit controls the connection state of the plurality of battery-set circuit separation switches, so as to detect the voltage of each secondary-battery cell whose parallel connection is separated when the parallel-connection separation switch is turned off and so as to electrically separate, from the external load, the series module including the secondary-battery cell whose abnormal state is detected.

5. The battery pack according to claim 4, wherein the battery-abnormality detection circuit monitors the voltage of the secondary-battery cells connected in parallel when the parallel-connection separation switch is turned on.

6. The battery pack according to claim 4, wherein the parrallel-connection separation switch includes a switch one end of which is connected between secondary-battery cells of one series module and the other end is connected between secondary-battery cells of another series module, so that each secondary-battery cell of each series module is connected in parallel.

7. The battery pack according to claim 6, wherein the plurality of series modules includes two or three series modules.

8. The battery pack according to claim 4, wherein the parallel-connection separation switch includes a switch whose one end is connected between secondary-battery cells of each series module and its other end is electrically connected to one connection point, so that each secondary-battery cell of each series module is connected in parallel.

9. The battery pack according to claim 8, wherein the plurality of series modules includes three or more series modules.

10. The battery pack according to claim 4, wherein: the battery-abnormality detection circuit further includes a detection-circuit changing switch which selectively outputs the voltage of each secondary-battery cell of one series module among the plurality of series modules; and the battery-abnormality detection circuit changes the parallel-connection separation switch to its turned-off state, changes the connection state of the detection-circuit changing switch, thereby individually detects the voltage of each secondary-battery cell forming each series module, and based on a change in the voltage of each secondary-battery cell, individually detects an abnormal state in each secondary-battery cell.

11. The battery pack according to claim 10, wherein: the detection-circuit changing switch selectively outputs each terminal voltage of the plurality of secondary-battery cells forming one series module among the plurality of series modules; the battery-abnormality detection circuit further includes a plurality of amplifiers which output the voltage of each secondary-battery cell based on each terminal voltage; and the battery-abnormality detection circuit individually detects each output of the plurality of amplifiers, and based on a change in the voltage which it detects, individually detects an abnormal state in each secondary-battery cell.

* * * * *